No. 778,105. PATENTED DEC. 20, 1904.
P. BROSIG.
APPARATUS FOR MAKING PHOTOGRAPHIC NEGATIVES FOR THE GELATIN RELIEF PROCESS.
APPLICATION FILED MAY 17, 1904.
NO MODEL. 2 SHEETS—SHEET 1.
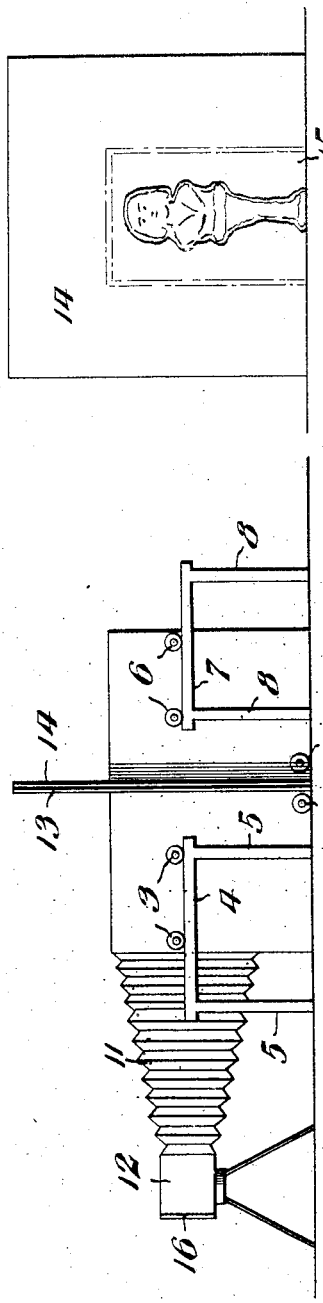
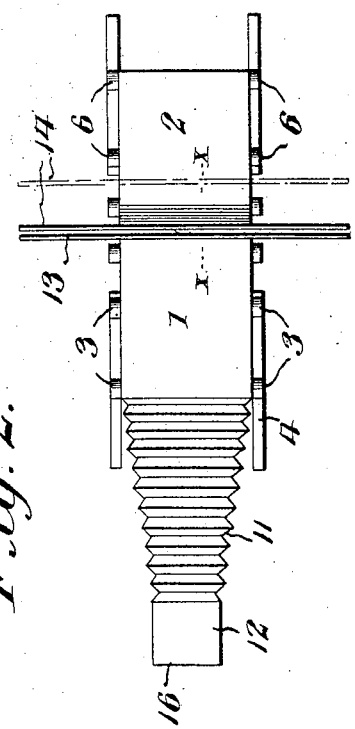
Inventor
Paul Brosig.
Witnesses
By Victor J. Evans
Attorney No. 778,105. PATENTED DEC. 20, 1904.
P. BROSIG.
APPARATUS FOR MAKING PHOTOGRAPHIC NEGATIVES FOR THE GELATIN RELIEF PROCESS.
APPLICATION FILED MAY 17, 1904.
NO MODEL. 2 SHEETS—SHEET 2.
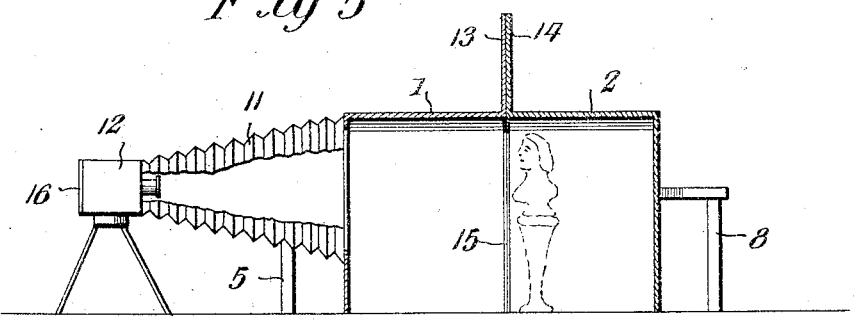
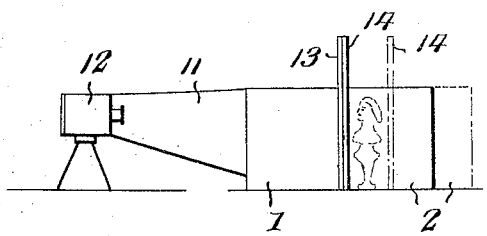 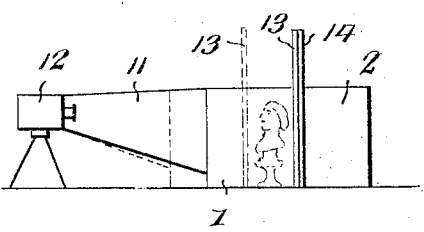
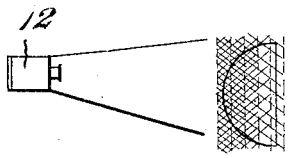 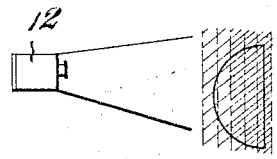
Inventor
Paul Brosig.
Witnesses
By Victor J. Evans
Attorney No. 778,105. Patented December 20, 1904.

UNITED STATES PATENT OFFICE.

PAUL BROSIG, OF NEWPORT, RHODE ISLAND.

APPARATUS FOR MAKING PHOTOGRAPHIC NEGATIVES FOR THE GELATIN-RELIEF PROCESS.

SPECIFICATION forming part of Letters Patent No. 778,105, dated December 20, 1904.

Application filed May 17, 1904. Serial No. 208,433.

*To all whom it may concern:*

Be it known that I, PAUL BROSIG, a citizen of the United States, residing at Newport, in the county of Newport and State of Rhode Island, have invented new and useful Improvements in Apparatus for Making Photographic Negatives for the Gelatin-Relief Process, of which the following is a specification.

This invention relates to an apparatus for making photographic negatives directly applicable for use in the formation of gelatin reliefs, the object being to produce by a single exposure a negative which shall exhibit by means of the varying opacity or density of the silver deposited on its sensitive film after development the differences in relief or intaglio of an object photographed with relation to a given plane. In a negative produced by this method the varying densities are not intended to nor do they show differences of light, shadow, and semitones nor the color of the object, but wholly the quality of relief. The highest or most prominent parts—that is to say, those nearest the sensitive film—will have the greatest density, while those at the greatest distance therefrom will be least dense. The intermediate parts accordingly will vary in density as they approach one or the other extreme.

The great value of a negative having the qualities above described is in the bichromated or swelled gelatin process used in the production of relief-work—a process well known to those skilled in the art—and consists, briefly, in applying a properly-made negative to a sheet of bichromated gelatin and exposing them to the action of light, which sets up a chemical reaction in the bichromated-gelatin film in inverse proportion to the density of the negative. After a proper exposure to light the gelatin film is removed and treated with water, which causes such parts of the film as have received little light because of the density of the superposed negative to swell from the imbibition of water. Those parts receiving the greatest quantity of light are practically unchanged, while the other parts swell in inverse proportion to the light received, as heretofore stated.

The negatives hereinabove described are produced by means of an apparatus of simple construction and easy manipulation, which is illustrated in the accompanying drawings, wherein—

Figure 1 represents a side elevation of my apparatus, showing a closed sectional hood and the front of a camera connected to a bellows opening into said hood. Fig. 2 is a top plan view thereof, showing in full lines the rear hood-section slightly opened to admit a narrow plane of light, and in dotted lines the rear hood is represented as open to its fullest extent. Fig. 3 is a view in elevation of the meeting face of the rear hood. Fig. 4 is a sectional view on the line $x\ x$ of Fig. 2. Fig. 5 is a vertical sectional view of the closed hood and a part of the bellows connection. Fig. 6 is a diagrammatic view of my apparatus, indicating the movement of the rear hood-section when the front of an object is to be first exposed to the light-plane. Fig. 7 is a similar view illustrating the movement of the front section to expose the rear of the object first to the light-plane. Figs. 8 and 9 are diagrammatic views illustrating by crossed lines the length of time light has fallen on the object exposed to the winding light-plane when arranged as indicated in Figs. 6 and 7, respectively.

Similar numerals of reference refer to the same parts in all the figures.

The construction and arrangement of the apparatus will first be described and then followed by a recital of the method for making a negative therewith.

1 and 2 indicate sections of a hood or inclosure axially disposed, with closed outer ends and partly-covered inner ends adapted to be brought into close contact with each other. On each side of the hood-section 1 are rollers 3, arranged to travel on rails 4, supported, for instance, on posts 5. Similar rollers 6 are carried by the hood-section 2, movable on rails 7, carried on posts 8. Rollers or casters 9 10 on the respective hood-sections 1 and 2 rest on the floor and support the inner ends of said sections. As thus arranged each hood-section may be easily moved to and from the other. The outer end of the hood-section 1 is connected by a bellows 11 or other flexible means to the front of a camera 12 in such manner that the objective or lens of said camera is inclosed within the bellows and open to the section 1. The several bellows connections are made light-tight, as are the abutting ends of the hood-sections when brought in contact. If desired, the section 1 may be of a length to entirely close the camera.

On the inner end of the hood-sections 1 and 2 are screens 13 and 14, respectively, their planes lying perpendicular to the axis of the hoods. These screens project for some distance on each side of and above the hood-sections, serving to prevent all light on their rear sides from entering between said screens when they are separated. The inner or proximate ends of each hood-section is covered with some suitable material 15, preferably paper, which may be easily cut to the outline of the object to be photographed. Natural light or a suitable artificial light is arranged to fall on each side of and on the top of the hood or inclosure in such manner that rays from the light will fall in a plane between the sections 1 and 2 when they are separated either slightly or to their full width, the light-plane being substantially at right angle to the axis of the hood or inclosure—in other words, parallel to the screens 13 and 14.

Before placing an object in the inclosure to be photographed the paper or other material 15, covering the inner end of each hood-section, is partly cut away, the portion remaining closely following the outline of the object. Light is thereby prevented from getting behind the object or into the camera, which would tend to produce false effects on the negative. The hood section or sections are then separated and the object placed within the hood-section 2 in such position that its most prominent or forwardly-projecting points will lie in the plane of contact of the two hood-sections. The hood or inclosure is then closed. The illuminating medium at the sides and top of the inclosure is now turned on, a plate-holder 16, containing a sensitized film, placed on the camera, and the objective uncovered. The hood-section 2 is then drawn away from section 1. The instant a separation occurs, however slight, light will enter in an exceedingly narrow plane perpendicular to the axis of the hood and objective from the sides and top, and, falling on such parts only of the object as lie in the light-plane, will be focused by the objective on the sensitive film in the camera. As the hood-section 2 travels away from the hood-section 1, increasing the space between them, the light-plane gradually widens and falls on more and more of the object thus exposed by the movement of the hood-section 2 until the rearmost plan of the object is exposed. The objective will then be covered and the film developed. It is to be remembered that light continues to fall on the object during the backward motion of the hood-section 2, from which it follows that such portions of the object as were first exposed continue to be lighted and chemically act on the sensitive film, decomposing more and more of the salts of silver, which when the film is developed will be deposited in a dense opaque mass where light has continuously fallen, gradually decreasing in intensity as the shortening of exposure lessens the time light has fallen on the film until the rearmost plane of the object is reached, where there will be little or no silver deposited on the film. This process is disclosed diagrammatically in Fig. 6 and the graduated length of exposure in Fig. 8.

The light-values on the negative may be inverted, if desired, by placing the object within the hood-section 1, with the most prominent or protruding parts on its rear side in the plane of meeting of the two hood-sections, and then moving the hood-section 1 instead of that 2. This is diagrammatically exhibited by Fig. 7 and the gradual increasing time of exposure by Fig. 9.

In the diagrammatic views, Figs. 8 and 9, the changes of light are indicated abruptly. This abruptness will not occur in practice, as the exposure of the object will be gradual and the lines of demarcation displayed in the drawings will not appear.

Having thus described the invention, what is claimed as new is—

1. In a photographic apparatus, a light-tight hood or inclosure formed of two separable parts, a camera having its objective or lens within said light-tight inclosure, and means on the contiguous ends of each section of said light-tight inclosure to direct a gradually-widening plane of light at right angle to the axis of the camera and light-tight inclosure.

2. In a photographic apparatus, a light-tight hood or inclosure formed of two separable sections, a camera having its objective within said light-tight inclosure and a screen on the contiguous end of each section of said light-tight inclosure.

3. In a photographic apparatus, a light-tight hood or inclosure formed of two separable sections, a camera having its objective within said light-tight inclosure, a screen on the contiguous end of each section extending beyond and above its sides and top, and a screen covering the inner end of each of said sections adapted to fit the outline of the subject to be photographed.

4. In a photographic apparatus, a light-tight hood or inclosure formed of two sections, one of said sections being movable away from the other, a camera having its objective or lens within one of said sections, and means on the contacting end of each section to cut off all light from entering between said sections except in a plane perpendicular to the axis of said sections.

5. In a photographic apparatus, a light-tight hood or inclosure formed of two separable sections, a camera, a light-tight flexible connection between said camera and one of said sections, and a screen on the contacting end of each section of said light-tight inclosure.

In testimony whereof I affix my signature in presence of two witnesses.

PAUL BROSIG.

Witnesses:
SIMEON HAZARD,
ALICE C. MALONEY.